US012392643B2

(12) United States Patent
Borsboom et al.

(10) Patent No.: US 12,392,643 B2
(45) Date of Patent: Aug. 19, 2025

(54) SENSOR ARRANGEMENT

(71) Applicant: SFS Group International AG, Heerbrugg (CH)

(72) Inventors: Lucas Borsboom, LL Roermond (NL); Mark Peeters, Heerbrugg (CH)

(73) Assignee: SFS Group International AG, Heerbrugg (CH)

( * ) Notice: Subject to any disclaimer, the term of this patent is extended or adjusted under 35 U.S.C. 154(b) by 295 days.

(21) Appl. No.: 17/983,706

(22) Filed: Nov. 9, 2022

(65) Prior Publication Data
US 2024/0151607 A1    May 9, 2024

(30) Foreign Application Priority Data

Nov. 10, 2021    (EP) .................................... 21207576

(51) Int. Cl.
*G01D 11/24* (2006.01)
*E04D 13/00* (2006.01)
*G01M 3/16* (2006.01)

(52) U.S. Cl.
CPC ......... *G01D 11/245* (2013.01); *E04D 13/006* (2013.01); *G01M 3/16* (2013.01)

(58) Field of Classification Search
CPC ....... G01D 11/245; E04D 13/006; G01M 3/16
See application file for complete search history.

(56) References Cited

U.S. PATENT DOCUMENTS 5,080,542 A * 1/1992 Sheahan ............... E04D 13/006
411/395
6,701,274 B1 * 3/2004 Eryurek ............... G01L 19/0092
702/140

(Continued)

FOREIGN PATENT DOCUMENTS

DE     3600374     12/1987
EP     2541223     1/2013

(Continued)

OTHER PUBLICATIONS

Andujar-Montoya Maria et al: "A Context-Driven Model for the Flat Roofs Construction Process through Sensing Systems, Internet-of-Things and Last Planner System", Sensors, vol. 17, No. 7, 27 pages, Jan. 1, 2017 (Jan. 1, 2017), www.mdpi.com/journals/sensors.

*Primary Examiner* — Justin N Olamit
(74) *Attorney, Agent, or Firm* — Volpe Koenig

(57) ABSTRACT

A sensor arrangement for identifying and measuring environmental parameters, in particular in flat roof structures, including a first group of functional units containing at least one sensor and a transmission/reception antenna for wireless communication, and a second group of functional units containing at least one sensor, a measurement, storage and evaluation unit, and a power supply. The two groups of functional units are accommodated in separate housings, but operatively connected to one another. The first functional group has a sensor for water in liquid form and a humidity sensor, and the second functional group preferably has at least one surface pressure sensor. A measurement network can include a group of the sensor arrangements that are controlled/monitored from a common transmission/reception unit. The installation of such a measurement network is also described.

13 Claims, 1 Drawing Sheet

(56) References Cited

U.S. PATENT DOCUMENTS

| | | | | |
|---|---|---|---|---|
| 9,602,122 B2* | 3/2017 | Rud | ............... | G05B 23/0221 |
| 10,042,341 B1* | 8/2018 | Jacob | ............... | G01M 3/16 |
| 10,713,554 B2* | 7/2020 | Gasser | ............... | E04B 1/7633 |
| 10,761,524 B2* | 9/2020 | Wallace | ............... | G05B 23/0224 |
| 2021/0003429 A1* | 1/2021 | Zafar | ............... | G06N 20/00 |

FOREIGN PATENT DOCUMENTS

| | | |
|---|---|---|
| EP | 3366931 | 8/2018 |
| JP | 2015215226 | 12/2015 |
| KR | 20070092374 | 9/2007 |
| WO | 2019113590 | 6/2019 |

* cited by examiner

SENSOR ARRANGEMENT

INCORPORATION BY REFERENCE

The following documents are incorporated herein by reference as if fully set forth: European Patent application No. 21207576.6, filed Nov. 10, 2022.

TECHNICAL FIELD

The present invention is concerned with a sensor arrangement for identifying and measuring environmental parameters and identifying damage in the roof area of buildings, in particular in the case of flat roofs.

BACKGROUND

Highly complex building shells consisting of multilayer functionally coordinated layers are increasingly being used in the building trade. These use combinations of thermal insulation layers, supporting/fixing elements and protective membranes against environmental influences such as wind, rain, snow, etc., both for exterior walls and for roof structures. Combinations of mineral fiber products, foams, plastic films and punctiform securing elements therefor are customary today, especially in the case of roof structures.

Keeping such building shells continually vapor resistant and watertight requires not only coordinated selection of products but also great care during processing and installation. In the case of industrial roofs having sometimes thousands of square meters, where there may be hundreds of meters of weld seams between plastic film webs, the demands are particularly high. An aggravating circumstance is that the increasingly thick insulation layers may take in water depending on the material, meaning that any leaks cannot be spotted until later and the damage that has occurred is then already great.

PRIOR ART

Various solutions to this problem are described in the prior art. Firstly, detection methods for leaks are used that involve various diagnostic methods. There are electrical methods, involving a network of electric lines being introduced into the substructure or into the roof structure. Following local water ingress, leakage currents are able to be measured because the electrical insulation effect of the roof structure changes. Alternatively, leak tightness measurements may be performed using overpressure, or using imaging thermography, for example because a leak produces a thermal bridge. A common feature of all the methods is a high level of effort during application, or during installation.

A shared problem of all such environmental monitoring systems is which of the collected data are to be transmitted, how and when, inter alia on the basis of the following criteria: measurement intervals, storage of the data on demand; continuous, periodic or discontinuous monitoring on demand, active alerting when damage occurs. The way in which such a system is designed substantially influences purchase, installation and operating costs.

Ideally, such a system is designed so that it is able to transmit data both actively (alerting) and on request. It is advantageous if this does not require the monitored building surface to be accessed, but rather wireless monitoring is possible. This requires the sensors themselves and the power supply therefor to be designed to be robust as well as power-saving and durable.

Known systems having RFID-coupled sensors use a semiconductor component, referred to as a transponder, having an antenna and a matching reader. Such RFID systems have the advantage that the antenna is used not only to identify the transponder but also to supply power via magnetic alternating fields or by way of high-frequency radio impulses (induction). This power supply is sufficient to operate simple sensors. In combination with nonvolatile memories, it is thus possible to set up measurement networks that require no cabling or dedicated power supply. However, the price of this advantage is the disadvantage that a reader needs to come very close to the RFID antenna.

A grommet provided with RFID as part of a securing element for a building shell is described by EP 3 366 931. The grommet can best be described as a pipe section having a planar, disk-shaped head enlargement at one end and a tip in the form of a cone at the other. The grommet receives a sensor arrangement, having at least one RFID transponder with an antenna, and a sensor connected to the transponder.

The specification JP 2015-215226 A shows a monitoring device (state detection device) that is designed to monitor a state. Specifically, a screw-like sleeve that may be screwed into an exterior structure is proposed that has a sensor arrangement in its interior. The associated communication antenna is accommodated in the head of the device. The actual sensor (probe electrode 11a) is described as being accommodated in the tip and also as being able to protrude from an opening there and can come into contact with the surrounding structure.

The Korean laid-open specification KR 20070092374 A describes a device (geoinformation point) shaped as a nail and having an electronic tag that may be introduced into the ground. Said tag is read wirelessly and thus permits access to a database containing information about the surroundings, e.g. electric lines in the ground. It is proposed that RFID technology be used.

A disadvantage of the prior art is that the costs of production for wired measurement networks are very high. Damage to cables can entail the complete failure or partial outage of such a measurement network.

SUMMARY

The present invention is concerned with this problem and provides a solution having one or more of the features disclosed herein. The sensor arrangements described are flexible, robust and individually independent.

Further variants and expansion levels of the invention are described below and in the claims.

The term sensor as used herein means a measurement device or probe for recording a physical variable (such as temperature, pressure) or an environmental parameter (humidity, water level). A sensor arrangement comprises not only a sensor but also the peripherals required for operation thereof, such as e.g supply of power, memory, evaluation and transfer electronics. In what follows, measurement network means a physical arrangement of sensor arrangements that are operated together. A measurement network does not need to be equipped with identical sensors or identically equipped sensor arrangements for this purpose.

A sensor arrangement is provided, as described above, to identify and measure environmental parameters. For the purposes of the present invention, it comprises a first group of functional units, including at least one sensor and a transmission/reception antenna for wireless communication.

A second group of functional units comprises at least one sensor, a measurement, storage and evaluation unit and a power supply.

The term "group of functional units" means that the sensors or further assemblies referred to form a logical action unit. To this end, they may be arranged on a common PCB (printed circuit board) or arranged discretely, but in operatively connected form. A characteristic is that the two functional groups are accommodated in separate housings. The two housings are in turn operatively connected to one another.

Both groups thus contain sensors, but the power supply is in each case associated with the second group and the transmission/reception antenna (this assembly may also comprise amplification and signal conversion components) with the first group. The reason for this distribution of the assemblies is the advantage for application: the second assembly is intended and designed to be installed deeper in the insulation layer of a flat roof than the first (see FIG. 1). In the deeper insulation layer, which has a more stable temperature, a constant power supply is easier to implement than at a location that is subject to large temperature fluctuations. The second functional group is intended exactly for this purpose and is therefore operatively connected to the first group preferably by way of a cable. This may be used to ensure a power supply from the first to the second group and also an exchange of information.

In an application as described above, the first group will comprise a sensor for water in liquid form and a humidity sensor, for example. Again from the point of view of intended use, a water sensor is placed at a point at which water collects or may flow. A humidity sensor may indicate incipient damage, even if no collected water is able to be detected yet. A leaking spot on a flat roof sometimes becomes wet, but does not necessarily collect the water that has entered. Conversely, a location with collected water does not have to be identical to the spot at which the water enters. As such, a multiplicity of applications may be covered by a specific combination of these sensors. In this regard, it makes sense if the housing of the second functional group has one or more apertures, or openings, for the sensors described. The dimensions of the openings are chosen by a person skilled in the art in such a way that the function of the sensor is ensured without compromising the structural integrity of the housing.

Likewise for the application described, but not just for said application, it makes sense for the second functional group to comprise a surface pressure sensor. A surface pressure sensor is able to detect e.g. the compression of a roof region caused by wind loads. A particularly useful application is obtained if the surface pressure sensor is mounted close to the surface flat beneath a roof membrane. As such, e.g. water collecting during heavy rain may be detected if a roof run-off becomes blocked. Alternatively, a critical roof load building up as a result of snow, in particular wet snow. If a multiplicity of sensor arrangements are installed, problem zones may be identified in a spatially resolved manner and measures to avoid permanent damage may be initiated. Surface pressure sensors that are able to perform this function are known and commercially available.

The minimum configuration of a sensor arrangement designed for the intended use described would comprise exactly these sensors. To extend the monitoring capabilities, further sensors may be added and integrated into the evaluation/measurement and storage logic. An example that could be mentioned is thermal sensors, e.g in regions that are very hot in summer, or tremor/vibration sensors for detecting roof movements in a storm.

A readily conceivable solution may also be for the two housings of the first and second functional groups to be able to be connected using a form fit by fitting them together along their longitudinal axis. This allows integral units to be produced having housing dimensions tailored to a specific roof structure. Such fitting-together may also be advantageous for transport and storage in the uninstalled state.

Plastic is advantageously chosen as the material for the two housings, because this allows the housings to be manufactured easily and in large numbers. Inside the housing, there may be provision for mounts, fixing points, latching devices, cable holders for the sensors to be installed, printed circuit boards or other components. The aforementioned fitting-together can be achieved in a known manner by appropriately designing the housing shape. For reasons of robustness, it is recommended that the housing be designed to be predominantly hollow-cylindrical, but a rectangular cross-sectional shape in subsections is also not impossible. As already mentioned, it may be necessary to provide the housing with openings in specific areas in order to allow sensors more direct communication with the surroundings. To avoid damage or functional impairment for the electronics or power supply, such components as printed circuit boards may be encapsulated or enveloped separately in order to make them more robust.

For the purpose of placing the housing, there may be provision for tools that correspond to the diameter of the housing in order to make an opening in the insulation material of the roof structure. Depending on the insulation material, these may be tools that just incise an opening, drill it or create it by way of removal. It is also conceivable for the housing itself, in particular that of the second group of functional units, to be provided with a tip that is able to create a channel e.g. in fibrous material by way of removal. Here too, a person skilled in the art will provide for tools that allow the housing to be placed even in materials that are thicker than the housing is long.

It is understandable that for such a sensor arrangement the power supply is the critical variable for performance and life. As was observed in the section relating to the prior art, hardwired sensor arrangements have an advantage in this respect and could even ease the information transfer via such a cable connection. In a flat roof of an industrial structure, however, this would sometimes require hundreds of meters of cables to be laid and accommodated in the roof structure in a protected manner. The requisite supply of power via an RFID antenna would be theoretically unlimited by the life, but needs to be individually addressed for reading. A measurement network cannot be implemented without further components. A sensor arrangement having a power supply that uses a battery with a life of more than 20 years is therefore preferably implemented. These are commercially available. Lives such as this can be attained in conjunction with modern, power-saving electronic components and a smart measurement, processing and transfer concept.

As mentioned repeatedly, the main intended use of the sensor arrangements presented is in the insulation layer of a flat roof. In the simplest embodiment, the latter will comprise (in the completely installed state) at least one statically load-bearing ceiling (trapezoidal sheets of steel, concrete, wood), an insulation layer arranged above that and a roof film that seals off the insulation layer from the surroundings. Installation would take place in the steps listed below. These steps should be understood as key parameters that are described in chronological succession but may be interrupted or supplemented by further intermediate steps for quality assurance, repair, etc. If individual steps in the succession are not imperative, an adjusted sequence will be covered in an equivalent manner.

The steps are as follows:
a) providing a flat roof having an insulation layer;
b) providing a number of sensor arrangements to be installed;
c) making an opening in the insulation layer at a predetermined point on the flat roof by way of preforming, incision, removal, drilling or cutting, or punching. This is governed by the type of insulation material and would take place in accordance with the relevant guidelines.
d) inserting a sensor arrangement into the cylindrical opening by introducing the housing of the second functional group to a predefined, or predetermined, depth. Depending on the sensor equipment, this feeding would be done manually or using appropriate tools
e) sliding the housing of the first functional group into the same opening until the predefined position for said group is reached. The two housings are therefore preferably situated vertically above one another in one and the same opening. Alternatively, there could also be provision for a lateral offset, depending on stipulation and application.
f) repeating steps c) to f) until all the intended sensor arrangements are installed;
g) laying and securing a roof film. This process is known in the prior art, as are the films, or roof membranes, to be applied depending on local building specifications, or stipulations from the manufacturer.

As described above, step d) may comprise mounting the housing containing the second functional group close to or in contact with the ceiling, and step e) may comprise mounting the housing of the first functional group close to, or on, the outwardly, or upwardly, pointing surface of the insulation layer. This is carried out in order to mount the respective sensor equipment at the intended place.

In particular, that end of the housing of the first functional group which has been introduced close to the surface of the insulation layer may finish flush with the surface of the insulation layer and, after step g), be in direct contact with the roof film. This is particularly advantageous for the functionality of the surface pressure sensor.

Installing a multiplicity of sensor arrangements, as described above, and using one or more transmission/reception station(s) for transferring data and instructions between the sensor arrangements and the transmission/reception station(s) produces a measurement network. The transmission and reception stations do not need to be mounted in/on the roof, but rather may be set up at a point that is advantageous for reception. These transmission and reception stations may have a power supply via cable and a dedicated data connection. It is thus conceivable to connect to an external reporting center, a cloud application or another measurement network.

Furthermore, the measurement network may be equipped with a computer-aided evaluation, storage and information conditioning unit designed to receive data from the sensor arrangements, to assess said data, to compare said data with target and alarm values and to use stored stipulations to output instructions to the sensor arrangements and/or display devices.

DETAILED DESCRIPTION

Figure 1:
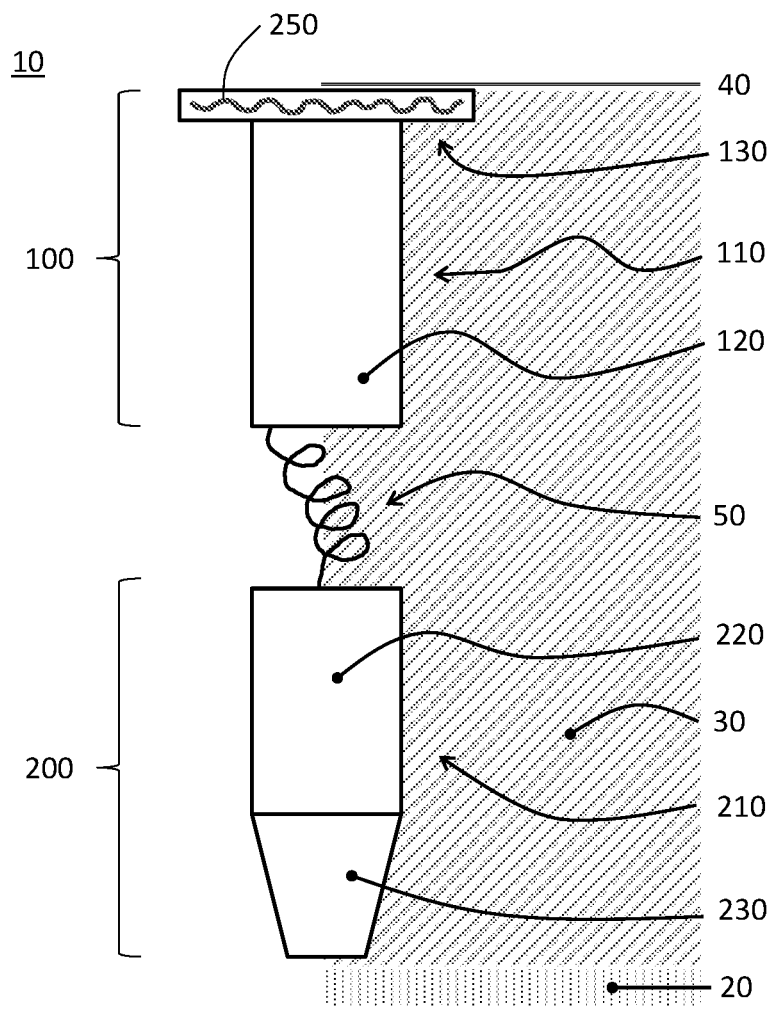
FIG. 1 is a cross-sectional view through a roof structure showing an installed sensor arrangement.

FIG. 1 shows a sensor arrangement 10 installed in a roof structure. The first functional group 100 is embedded in an insulation layer 30 at the top edge of the image, just below a roof film 40. The functional group 100 is accommodated in a housing 110, here consisting of a cylindrical body part 120 having a planar, disk-shaped head 130. This shape was chosen in order firstly to ensure that the body part 120 remains definitively in the upper part of the insulation layer 30, because the head 130 acts as a stop when inserted into the insulation layer 30. Secondly, this shape is advantageous for embedding a surface pressure sensor into the head 130 in a protected manner. Not least, the surface area of the head 130 also provides the opportunity to mount an antenna (indicated as 250).

The functional group 100, or the housing 110, is operatively connected to the second functional group 200, or the housing 210. This connection is ensured in this case by a connecting cable, indicated here as a spiral cable 50. This permits the use of a sensor arrangement 10 in insulation layers 30 of different thickness. The housing 210 likewise has a cylindrical body part 220 and a tip 230, which has the shape of a truncated cone here. In preferred embodiments, the underside (referenced to the drawing) of the truncated cone here will have an opening that points towards the surface of the ceiling 20 ("downwards"). This has the advantage that a sensor for water may be brought closer to precisely that surface on which liquids potentially collect.

Figure 2:
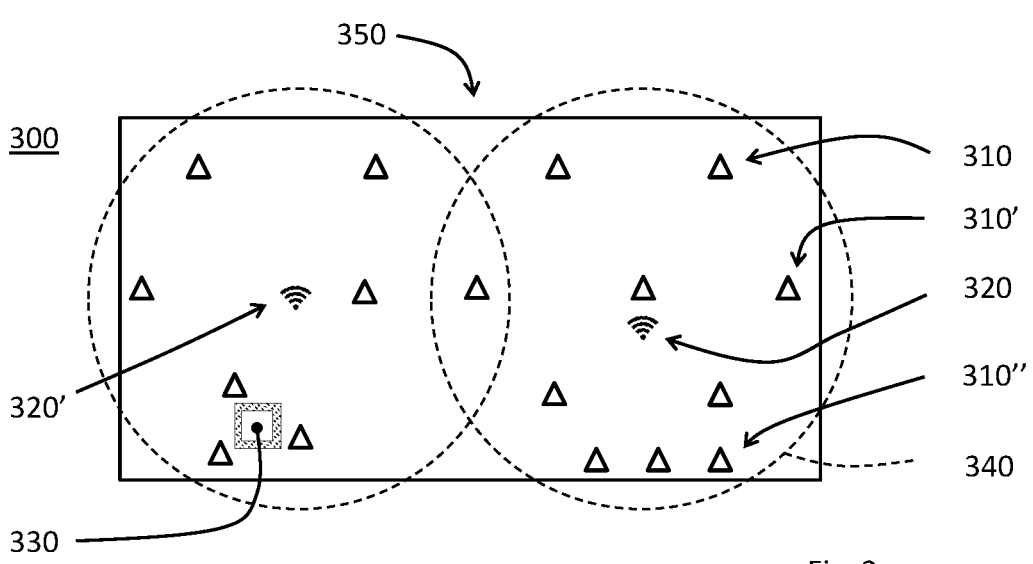
FIG. 2 is a schematic view of a roof showing a measurement network comprising individual sensor arrangements.

FIG. 2 shows a measurement network 300 comprising individual sensor arrangements 310, 310', 310", . . . (small triangles) arranged on a roof 350. The flush mounting, as shown in FIG. 1, is not meant to be important in this bird's eye view. It can be seen that some of the sensor arrangements 310 may be arranged in regular patterns, but also in denser groups. This may be appropriate for the task of monitoring damage, in order to be able to monitor at-risk roof sections more closely. As such, FIG. 2 shows multiple sensor arrangements 310 grouped around a skylight 330. Non-critical areas may be thinned out, on the other hand. The drawing shows two base stations 320, 320'. Both have a sphere of influence 340 that covers multiple sensor arrangements. In this sphere of influence, data may be received and transmitted between the sensor arrangements 310, 310', . . . and the base stations 320, 320'. The range will depend on the transmission/reception systems used, the local circumstances and any coverage of the sensors by snow or other material.

The invention claimed is:
1. A sensor arrangement (10) for identifying and measuring environmental parameters, for insulation in an insulation layer (30) of a flat roof (350), the sensor arrangement comprising:
a first group of functional units (100) including at least one first sensor and a transmission/reception antenna (250) for wireless communication;
a second group of functional units (200) including at least one second sensor, a measurement, storage and evaluation unit, and a power supply;
the first group of functional units (100) are accommodated in a first housing (110) and the second group of functional units (200) are accommodated in a second housing (210) that is separate from the first housing

(110) and the first housing and the second housing are operatively connected to one another;

the first housing (110) of the first functional group (100) is adapted to be arranged adjacent to a surface of the insulation layer (30) or flush with the surface of the insulation layer (30); and the first and second groups of functional units (100, 200) are operatively connected by way of a cable (50).

2. The sensor arrangement (10) as claimed in claim 1, wherein the second group of functional units (200) comprises a sensor for water in liquid form and a humidity sensor.

3. The sensor arrangement (10) as claimed in claim 2, wherein the first group of functional units (100) comprises a surface pressure sensor.

4. The sensor arrangement (10) as claimed in claim 1, wherein the power supply includes a battery having a life of more than 20 years.

5. The sensor arrangement (10) as claimed in claim 1, wherein the housing (210) of the second group of functional units (200) has one or more apertures for the at least one second sensor.

6. A method for installing a plurality of the sensor arrangements (10) as claimed in claim 1 in the insulation layer (30) of a flat roof (350), said flat roof (350) comprising at least one statically load-bearing ceiling (20) and the insulation layer (30) arranged thereabove; the method comprising:
 a) providing the flat roof having the insulation layer (30);
 b) providing a plurality of the sensor arrangements (10) to be installed;
 c) making an opening in the insulation layer (30) at a predetermined point on the flat roof by way of preforming at least one of incision, removal, drilling or cutting, or punching;
 d) inserting one said sensor arrangement into the opening by introducing the housing (210) of the second group of functional units (200) to a predefined, or predetermined, depth;
 e) sliding the housing (100) of the first group of functional units (100) into the same said opening until a predefined position for said first group of functional units is reached;
 f) repeating steps c) to f) until all of the plurality of the sensor arrangements are installed.

7. The installing as claimed in claim 6, further comprising g) laying and securing a roof film (40).

8. The installing as claimed in claim 7, wherein step d) further comprises mounting the housing (210) of the second group of functional units (200) close to or in contact with the ceiling (20), and step e) comprises mounting the housing (110) of the first group of functional units (100) close to, or on, an outwardly, or upwardly, pointing surface of the insulation layer (30).

9. The installing as claimed in claim 8, wherein an end of the housing (110) of the first group of functional units (100) which has been introduced close to the surface of the insulation layer (30) finishes flush with the surface of the insulation layer (30) and, after step g), is in direct contact with the roof film (40).

10. A measurement network (300) comprising a plurality of the sensor arrangements (10, 310, 310', ...) as claimed in claim 1 installed in an insulation layer (30) of a flat roof (350); and one or more transmission/reception station(s) (320, 320') for transferring data and instructions between the sensor arrangements (10, 310, 310', 310") and the transmission/reception station(s) (320, 320').

11. The measurement network (300) as claimed in claim 10, further comprising a computer-based evaluation, storage and information conditioning unit configured to receive data from the sensor arrangements, to assess said data, to compare said data with target and alarm values and to use stored information to output instructions to at least one of the sensor arrangements or display devices.

12. A sensor arrangement (10) for identifying and measuring environmental parameters, the sensor arrangement comprising:
 a first group of functional units (100) including at least one first sensor and a transmission/reception antenna (250) for wireless communication;
 a second group of functional units (200) including at least one second sensor, a measurement, storage and evaluation unit, and a power supply;
 the first group of functional units (100) are accommodated in a first housing (110) and the second group of functional units (200) are accommodated in a second housing (210) that is separate from the first housing (110) and the first housing and the second housing are operatively connected to one another; and
 the respective first and second housings (110, 210) of the first and second groups of functional units (100, 200) are connected or are adapted to be connected together using a form fit by fitting the first housing and the second housing together along longitudinal axes of the first housing and the second housing.

13. A monitored roof, comprising:
 a flat roof (350) having an insulation layer (30);
 a sensor arrangement (10) for identifying and measuring environmental parameters, the sensor arrangement including
  a first group of functional units (100) including at least one first sensor and a transmission/reception antenna (250) for wireless communication,
  a second group of functional units (200) including at least one second sensor, a measurement, storage and evaluation unit, and a power supply, and
  the first group of functional units (100) are accommodated in a first housing (110) and the second group of functional units (200) are accommodated in a second housing (210) that is separate from the first housing (110), and the first housing and the second housing are operatively connected to one another;
 the second housing (210) of the second group of functional units (200) is located at a predefined, or predetermined, depth in an opening in the insulation layer (30); and
 the first housing (110) of the first functional group (100) is arranged adjacent to a surface of the insulation layer (30) or flush with the surface of the insulation layer (30) in the opening in the insulation layer (30).

* * * * *